United States Patent
Bansal et al.

(10) Patent No.: US 7,570,015 B2
(45) Date of Patent: Aug. 4, 2009

(54) CONDITIONAL BATTERY CHARGING SYSTEM

(75) Inventors: Ravi Prakash Bansal, Tampa, FL (US); Rick Allen Hamilton, II, Charlottesville, VA (US); Brian Marshall O'Connell, Cary, NC (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 11/684,047

(22) Filed: Mar. 9, 2007

(65) Prior Publication Data
US 2008/0218126 A1  Sep. 11, 2008

(51) Int. Cl.
*H01M 10/44* (2006.01)
*H01M 10/46* (2006.01)
(52) U.S. Cl. ............................................. 320/106
(58) Field of Classification Search .............. 320/106, 320/107, 112, 114, 115, 132, 155, 157, 160, 320/161, 163
See application file for complete search history.

(56) References Cited

U.S. PATENT DOCUMENTS

| | | | |
|---|---|---|---|
| 5,939,864 A | 8/1999 | Lenhart et al. | 320/137 |
| 6,223,077 B1* | 4/2001 | Schweizer et al. | 607/5 |
| 6,337,560 B1 | 1/2002 | Kalogeropoulos | 320/160 |
| 6,771,047 B1 | 8/2004 | Ogonowsky | 320/128 |
| 7,062,390 B2 | 6/2006 | Kim et al. | 702/63 |

* cited by examiner

*Primary Examiner*—Edward Tso
(74) *Attorney, Agent, or Firm*—David A. Mims, Jr.; William Steinberg; Robert V. Wilder

(57) ABSTRACT

A method and system are provided in which a charging process for rechargeable batteries is controlled in accordance with selected predetermined variable conditions. In an exemplary embodiment, a user is enabled to select the predetermined conditions under which the charging of a battery is suspended until such conditions have changed. Such conditions include, for example, physical location of the battery being charged and/or the time and/or date when the battery is being charged. A user GUI is provided to enable a user to input selected times and/or dates and/or locations when the device containing the battery is likely to be away from a charging source and needs to be fully charged, and/or selected times and/or dates and/or locations when the device is likely to have access to a power source and the battery is enabled to be charged only to a storage level.

20 Claims, 4 Drawing Sheets

REMAINING CAPACITY AS A FUNCTION OF TEMPERATURE AND CHARGE LEVEL

| TEMPERATURE | 40% CHARGE LEVEL<br>(Recommended Storage Charge Level) | 100% CHARGE LEVEL |
| --- | --- | --- |
| 0 Degrees C | 98% After 1 Year | 94% After 1 Year |
| 25 Degrees C | 96 % After 1 Year | 80% After 1 Year |
| 40 Degrees C | 85% After 1 Year | 65% After 1 Year |
| 60 Degrees C | 75% After 1 Year | 60% After 3 Months |

CONDITIONAL BATTERY CHARGING SYSTEM

RELATED APPLICATIONS

Subject matter disclosed and not claimed herein is disclosed and claimed in related co-pending application, Ser. No. 11/684,018, which is assigned to the assignee of the present application.

FIELD OF THE INVENTION

The present invention relates generally to battery charging systems and more particularly to a system and methodology for enabling optimization of battery life for rechargeable batteries.

BACKGROUND OF THE INVENTION

An important component of mobile computing devices is the battery. Typically Lithium-ion batteries are used in such applications. Batteries using such technologies typically last between two and three years during which they continually lose capacity to hold a charge for long enough periods of time. The capacity loss manifests itself in increased internal resistance caused by oxidation. Eventually, the cell resistance reaches a point where the battery pack can no longer deliver the stored energy although the battery may still show as being fully charged. Increasing internal resistance with cycle life and age is typical for cobalt-based lithium-ion, a system that is used for cell phones, cameras and laptops because of high energy density. The speed by which lithium-ion ages is governed by temperature and state-of-charge.

Most mobile devices allow the battery to be fully-charged while the device is plugged into fixed power from an AC-DC adapter. Using a fully-charged battery while plugged into main power, as well as the elevated temperatures while the device is in operation contribute to a reduction in the life span of a battery. An ideal way to prolong battery life would be to disconnect the battery from the device being supplied while the device is drawing power from an AC-DC adapter. However, most users are unwilling to do so because of fear of loss of data if the operation of the AC-DC adapter is interrupted in any way.

Thus, there is a need for an improved system for providing a battery charging process for rechargeable batteries in order to increase battery life span.

SUMMARY OF THE INVENTION

A method and system are provided in which a charging process for rechargeable batteries is controlled in accordance with selected predetermined variable conditions. In order to increase battery life span, the charging of a rechargeable battery is selectively suspended prior to a fully charged state depending upon the current status of the predetermined variable conditions. In an exemplary embodiment, a user is enabled to select the predetermined conditions under which the charging of a battery is suspended until such conditions have changed. Such conditions include, for example, physical location of the battery being charged and/or the time and/or date when the battery is being charged. A user GUI is provided to enable a user to input selected times and/or dates and/or locations when the device containing the battery is likely to be away from a charging source and needs to be fully charged, and/or selected times and/or dates and/or locations when the device is likely to have access to a power source and the battery is enabled to be charged only to a storage level, short of a full charge, in order to enhance the lifespan of the battery.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
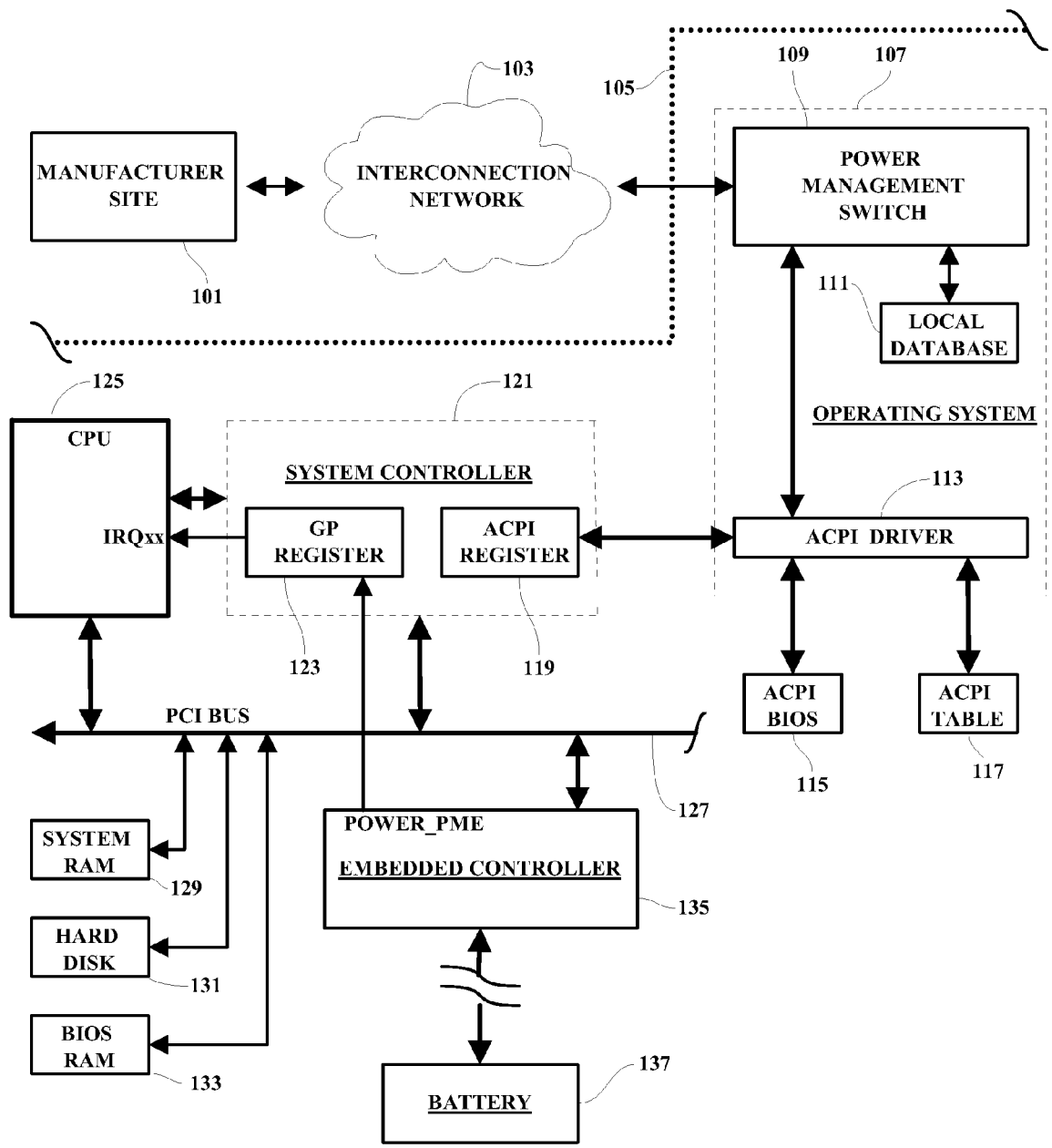
FIG. 1 is an illustration showing an exemplary system implementing the charging processing disclosed herein.

It is noted that devices which are shown in block or schematic form in the drawings are generally known to those skilled in the art, and are not specified to any greater extent than that considered necessary as illustrated, for the understanding and appreciation of the underlying concepts of the present invention and in order not to obfuscate or distract from the teachings of the present invention. Also, as used herein, the terms "inactive status" and "storage status" for rechargeable batteries have the same meaning and are used interchangeably.

The process described herein includes several battery life enhancement features. For example, in a system for charging the battery within a notebook computer, the system is selectively programmed to connect to and interrogate the battery manufacturer. The system determines the Model and type information from the notebook and automatically contacts the manufacturer's online database to download the latest optimal charging threshold specifications, i.e. the system is adaptive and can adapt itself to different batteries and technologies.

A user of the battery charging system may need the battery to be fully-charged at some times when a user is likely to be away from a fixed AC source or actively being used. And, at other times, the user may not need the battery to be fully-charged such as when the user is using the mobile device as a desktop replacement and is most likely to have the device plugged into an AC mains source via an AC-DC Adapter. The charging system provides an ability to take into account the above fact and uses day and time windows to intelligently control the charge level of the notebook battery that would be most beneficial to the user. The system can also use the user's location to intelligently control the charge level of the notebook battery that would be most beneficial to the user as described in greater detail below.

The advantage of this system is that a user can have a battery that is 100% charged when the user needs it most and a "life span extending" less than 100% charge when the user is using the mobile device as a desktop replacement. This way the user can gain the benefit of an extended battery life while reducing the chance that the user will be forced to use a less than fully-charged battery when he/she needs it the most.

The examples disclosed herein use a computer-implemented method that enables a notebook/PDA/laptop owner to control the battery charge level using the Advanced Configuration and Power Interface (ACPI) so as to improve the battery's longevity. The system of controlling the charging process of rechargeable batteries may also be implemented in many other arrangements. The computer-implemented processing, in a software form, can run on a mobile device such as notebook that utilizes the ACPI interface.

In the present example, the system utilizes the ACPI specification developed to establish industry common interfaces enabling robust operating system (OS)-directed motherboard device configuration and power management of both devices and entire systems. ACPI is the key element in the exemplary Operating System-directed configuration and Power Management (OSPM). Under ACPI, a battery device is handled via the Control Method defined by AML (ACPI Machine Language). Currently, the ACPI is implemented by many notebook manufacturers. This allows manufacturers of the mobile devices to equip the devices with "Smart Batteries". The Smart battery subsystem enables a software package to utilize OS-level API to interrogate battery characteristics such as charge level as well as to control the charging. Specifically, the battery information can be obtained via the Control Method Battery Information object, _BIF. (see Section 10.2.2.1 of the Revision 3.0b, Oct. 10, 2006, ACPI Specification which is included herein by reference). In addition, the battery charging can be enabled and disabled by controlling Bit 1 of the _BMC (Battery Management Control) object defined in the ACPI interface. (see ACPI Section 10.2.2.7) The advantage of this solution is that it is entirely software-based and does not require any hardware modifications. The only prerequisite is that OS and battery subsystem of a mobile device implement the ACPI interface. It is understood, however, that the invention may also be implemented in many other systems and hardware/software combinations.

FIG. 1 shows an exemplary architecture of a portion of a user device utilizing the battery charging system. The user device may be any device that utilizes a rechargeable battery although, in the illustrated example, a laptop computer system is described. The diagram shows a CPU 125, a PCI bus 127, RAM 129, BIOS 133 and a hard-disk 131, a system controller 121 and an embedded controller 135 which is selectively coupled to a battery and battery subsystem 137. The system controller 121 can provide battery event information to the CPU 125 via a system interrupt. This happens when the embedded controller's POWER_PME signal writes appropriate information into the GP register 123 of the system controller 121. In addition, the system controller 121 also contains an ACPI register 119. The software package disclosed in this example utilizes the ACPI driver 113, and the connected ACPI BIOS 115 to write commands into the ACPI register 119 or the ACPI table 117. These commands are sent to the embedded controller 135 via the PCI-bus 127 and enable communication with the battery sub-system 137 to control its charging level. The system illustrated also has connectivity within the operating system 107 through the power management switch 109 and the Internet 103 to a battery manufacturer web site 101 or other site for downloading battery information for a particular battery being charged. The system further includes a local database 111 to store this battery-related information.

Figures 2, 3:
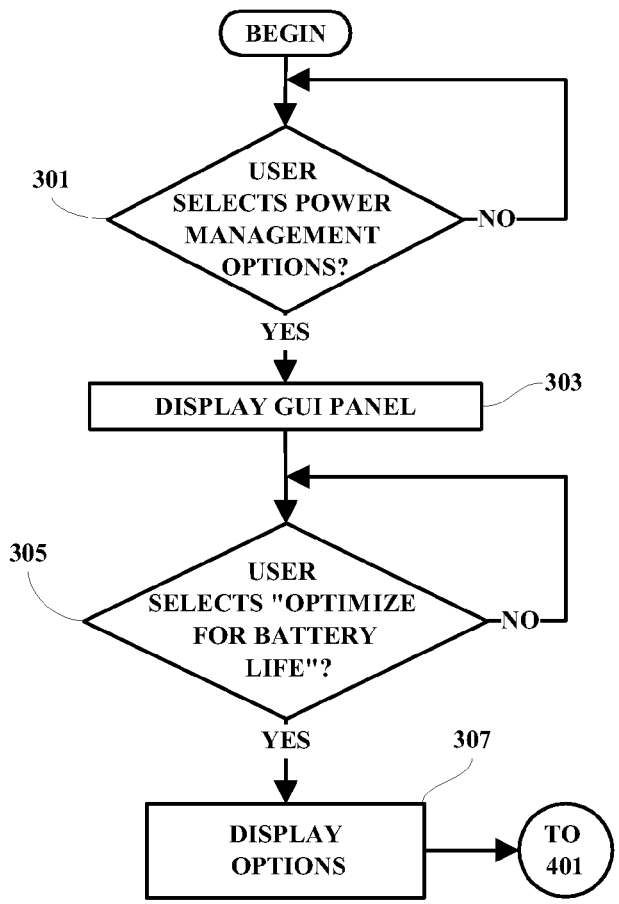
FIG. 2 is table showing the effects of temperature and charge level on battery capacity.
FIG. 3 is a flow chart illustrating an exemplary set-up functional sequence for one embodiment of the present invention.

In the table shown in FIG. 2, the effects of charge level and temperature on remaining capacity of a battery are illustrated. As illustrated, a recommended storage or inactive charge level for the battery example illustrated to provide the highest capacity after a period of time is 40% as shown in the second column of the table and not fully charged at 100% as shown in the third column of the table. In other words, a particular battery will have an enhanced life span if the charge level on the battery is kept no higher than a manufacturer-given percentage (e.g. 40%) when the battery is in a storage or inactive state, and this is true no matter what the environmental temperature is.

In the exemplary embodiment of the present invention, a GUI is selected by a user and displayed on a device display screen in order to enable the user of the device, e.g. a laptop computer, to make certain battery life span-enhancing selections in a battery enhancement set-up process. The system gives a user the ability to prolong battery life by selecting an "optimize for battery life" as a power management option on a displayed GUI. Once the above option is selected, the software enables the user to select "basic" mode, "calendar" mode and "location" mode. An exemplary flowchart illustrating the set-up sequence for the battery charging system is shown beginning with FIG. 3.

Figure 4:
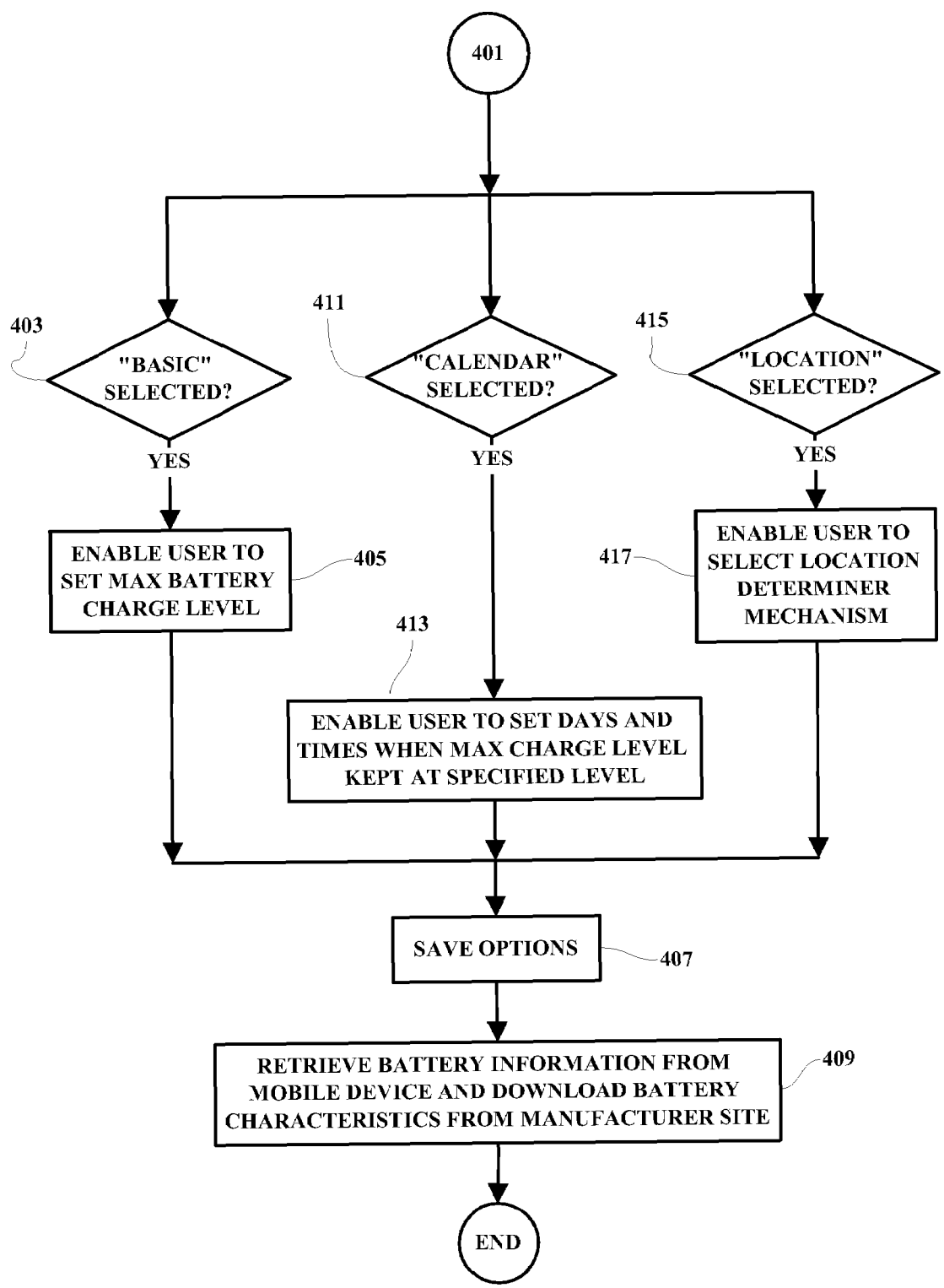
FIG. 4 is a continuation of FIG. 3.

As shown in FIG. 3, when a user selects to use the power management options 301, a graphical user interface (GUI) is displayed 303 (not shown), and if the user then selects to "Optimize for Battery Life" 305, the user is presented with several options as shown beginning with FIG. 4.

As shown in FIG. 4, a user may select one or more battery charging modes including a "Basic" mode, a "Calendar" mode and/or a "Location" mode. If the user selects the Basic mode 403, the user is enabled to set the maximum battery charge level 405 through a user input to the GUI. If the user selects the Calendar mode 411, the user is enabled 413 to set calendar days and/or times when the maximum charge level is kept at a specified level. For example, when the user is most likely to be plugged-in full time to an AC source, the charge level of the battery can be kept at a lower level such as 40%. Outside of this time slot, the system allows the battery to charge up to full 100%, i.e. when the user is most likely to disconnect the power and move away from an AC source. If the user selects the Location mode 415, the user is enabled 417, through input to the GUI, to select a location determiner device or mechanism such as Service Set Identifier (SSID) of a wireless network, network profile, ping trace, Global Positioning System (GPS) or other location determining devices to determine the location of the device containing the rechargeable battery. Further details of these location determining devices or mechanisms are discussed below. After selecting the mode for use of the battery charging process, the user selections are saved 407 and the specific battery information is then retrieved from the device and the battery characteristics for the specific battery being used may then (or later) be retrieved and saved from the battery manufacturer 409.

In an exemplary operation, in the "basic" mode, the software retrieves the battery information from the mobile device, looks up the manufacturer online resource address from the database, connects to the manufacturer site, downloads optimized battery charging characteristics including optimum state-of-charge (SOC) level, and monitors the battery charge level. If the laptop is plugged into an AC source, and battery charge level is less than the optimum SOC level, the charging function is switched ON charging the battery via ACPI interface. If the laptop battery charge is greater than the optimum SOC level, the charging function is disabled and the system stops or suspends charging the battery.

In the "calendar" mode, the software controls charging level based on user specifications using a calendaring function. The software provides a GUI screen where a user can configure times and days when the battery should be kept at SOC level (i.e. when he/she is most likely to be plugged-in full time to an AC mains source). Outside of this time slot, the software allows the battery to charge up to full 100%, i.e. when the user is most likely to disconnect the power and move away from an AC mains source. More specifically, the system retrieves the battery information from the mobile device, looks up the manufacturer online resource address from the database, connects to the manufacturer site and downloads optimized battery charging characteristics including optimum state-of-charge (SOC) level. If "calendar" mode has been selected, the system checks the current time, and if the current time within "maximize battery life" time slot, the system will stop charging if the charge is greater than optimum SOC level. If current time outside the above slot, the system continues to charge the battery.

In the "location" mode, the software controls the charging based on the location of the mobile user. The system determines whether the user is in a location where his notebook is most likely to be disconnected from a power source. If so, it keeps the charge at 100%. Otherwise, the charging level is kept as per downloaded battery characteristics.

The location of the user is determined by the following three methods, although others may also be implemented. In an "SSID" location determining method, if the user uses a wireless connection, the SSID of the current wireless connection is used to determine the location. The user can configure a list of SSIDs as the designated locations where his or her notebook is more or less likely to be disconnected from a power source.

In a "Network Profile" location determining method, the location of the user device is based on the combination of network settings, IP address/Subnet Mask/DNS, and the location can be discovered and profiled. Additionally, in situations where those characteristics are not unique such as private 192.168.1 or 10. networks the ping/trace route profile method described below is used to determine the network location of the device.

In the Ping/trace route profile method, when the user is on a designated "home" private subnet, the software creates a "ping profile" by repeatedly pinging or even trace routing different hosts around the internet. If the ping profile changes substantially because the user moved to another private subnet, it determines that the location has changed and keeps the battery charged fully charged. Similarly, an external IP address reporting service may be queried, such as http://whatismyip.org.

In another embodiment of the system, the software can take advantage of RFID or GPS devices to determine location if the notebook is equipped with such devices. As mentioned, other location determination methods seem less attractive at this time, but may be cost-optimal in the future, such as cellular triangulation for determination of position.

Figure 5:
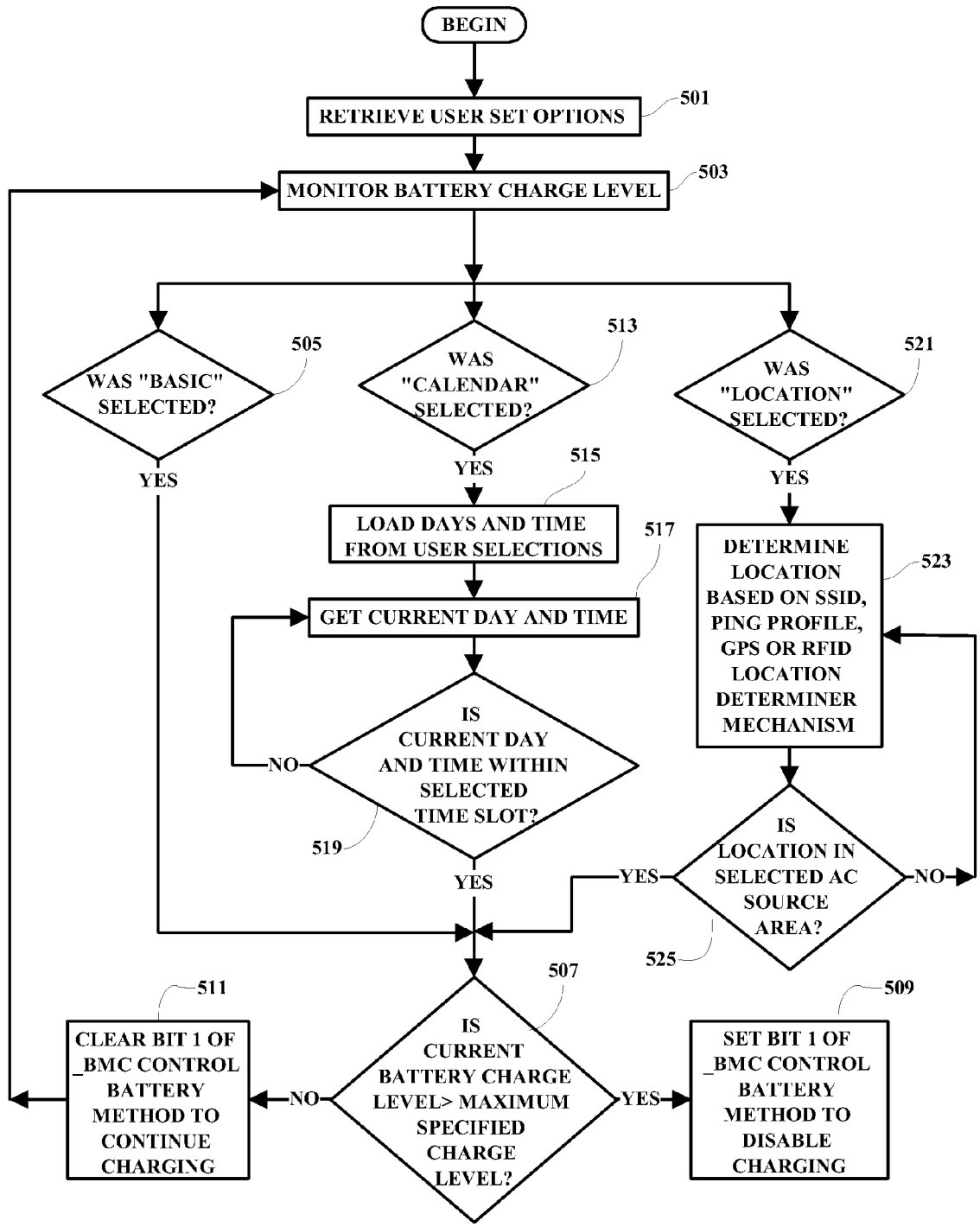
FIG. 5 is a flow chart illustrating an exemplary functional sequence for an operation of the battery charging process in accordance with one embodiment of the present invention

An overall sequence of an exemplary operation of the present invention is illustrated in flow chart form in FIG. 5. As illustrated, the system will first retrieve the options set by the user 501 and monitor the battery charge level 503. If the Basic mode had been selected by the user 505, it is determined whether or not the current battery charge level is greater than the maximum specified storage charge level 507. If so, bit 1 of _BMC control battery method is set to disable further charging. If not, the _BMC bit is cleared to continue charging 511 while continuing to monitor the battery charge level 503.

If the Calendar mode had been selected 513 by the user, the days and times input by the user are retrieved 515 as well as the current day and time 517. If the current day and time is within the selected time slot input by the user 519, then it is determined whether or not the current battery charge level is greater than the maximum specified storage charge level 507. If so, bit 1 of _BMC control battery method is set to disable further charging. If not, the _BMC bit is cleared to continue charging 511 while continuing to monitor the battery charge level 503.

If the Location mode had been selected 521 by the user, then the location of the device is determined by the selected method of determining location as input by the user 523. If the current location of the device is within a user selected "AC source" area, i.e. an area in which the user has access to an AC source and desires to stop or cap charging the battery while the device in this area after a designated maximum charge is attained, then it is determined whether or not the current battery charge level is greater than the maximum specified storage charge level 507. If so, bit 1 of _BMC control battery method is set to disable further charging. If not, the _BMC bit is cleared to continue charging 511 while continuing to monitor the battery charge level 503.

The optimum charge level can be dynamically based on the age of the battery. For example, an older battery may require holding the charge lower than a new battery. The optimum charge level can also be dynamically based on the number of battery recharge cycles that battery has undergone over its life. For example, a heavily recharged battery may require holding the charge lower than a battery that hasn't been heavily used. The optimum charge level can also be based on monitoring history of frequency of disconnection from power supplies, such as in an environment prone to power outages. All of the above and other conditions which affect battery life may be monitored and saved for use in determining an optimal charge level for extended battery life.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in volatile or non-volatile media containing program code, for example, stored on a CD, disk or diskette (portable or fixed), or other storage or memory device, or electronic array, from which it may be executed or transmitted to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for selectively charging a specific battery within an electronic device, said method comprising:
    enabling a user to select a situational condition relative to said electronic device in which said specific battery within said electronic device will be charged to a fully charged level or only to a storage charge level, said storage charge level being less than a fully charged level;
    determining when said selected situational condition exists with respect to said electronic device; and
    enabling a charging of said specific battery to a fully charged level or only to a storage charge level, depending upon a current existence of said selected situational condition.

2. The method as set forth in claim 1 wherein said situational condition is a selected time period.

3. The method as set forth in claim 2 wherein said specific battery is enabled to be charged to a fully charged level during said selected time period.

4. The method as set forth in claim 2 wherein said specific battery is enabled to be charged to a storage charge level during said selected time period.

5. The method as set forth in claim 1 wherein said situational condition is a selected location.

6. The method as set forth in claim 5 wherein said specific battery is enabled to be charged to a fully charged level when said electronic device is within said selected location.

7. The method as set forth in claim 5 wherein said specific battery is enabled to be charged to a storage charge level when said electronic device is within said selected location.

8. The method as set forth in claim 2 wherein said method further includes:
   retrieving a current time;
   comparing said current time with said selected time period; and
   enabling a charging of said specific battery to a fully charged level or only to a storage charge level, depending upon a detected relationship between said current time and said selected time period.

9. The method as set forth in claim 5 wherein said method further includes:
   determining a current location of said electronic device;
   comparing said current location with said selected location; and
   enabling a charging of said specific battery to a fully charged level or only to a storage charge level, depending upon a detected relationship between said current location and said selected location.

10. The method as set forth in claim 9 wherein said location is determined using a GPS or RFID system.

11. The method as set forth in claim 9 wherein said location is determined using an SSID location determining methodology.

12. The method as set forth in claim 9 wherein said location is determined using a network profile location determining methodology.

13. The method as set forth in claim 9 wherein said location is determined using a ping/trace location determining methodology.

14. The method as set forth in claim 1 and further including:
   detecting specific battery charging information for said specific battery;
   retrieving charging information for said specific battery;
   retrieving a recommended storage charge level for said specific battery, said recommended storage charge level being less than a fully charged level for said specific battery;
   monitoring an actual charge level for said specific battery as said specific battery is being charged; and
   terminating said charging of said specific battery depending upon a current existence of said selected situational condition.

15. A storage medium, said storage medium being selectively coupled to processing circuitry, said storage medium containing indicia readable by said processing circuitry for providing program signals to control charging a specific battery within an electronic device from a charging source when said electronic device is connected to said charging source, said program signals being effective for enabling:
   enabling a user to select a situational condition relative to said electronic device in which said specific battery within said electronic device will be charged to a fully charged level or only to a storage charge level, said storage charge level being less than a fully charged level;
   determining when said selected situational condition exists with respect to said electronic device; and
   enabling a charging of said specific battery to a fully charged level or only to a storage charge level, depending upon a current existence of said selected situational condition.

16. The medium as set forth in claim 15 wherein said situational condition is a selected time period.

17. The medium as set forth in claim 15 wherein said situational condition is a selected location.

18. A system for selectively charging a specific battery within an electronic device, said system comprising:
   means for enabling a user to select a situational condition relative to said electronic device in which said specific battery within said electronic device will be charged to a fully charged level or only to a storage charge level, said storage charge level being less than a fully charged level;
   means for determining when said selected situational condition exists with respect to said electronic device; and
   means for enabling a charging of said specific battery to a fully charged level or only to a storage charge level, depending upon a current existence of said selected situational condition.

19. The system as set forth in claim 18 wherein said situational condition is a selected time period.

20. The system as set forth in claim 18 wherein said situational condition is a selected location.

* * * * *